United States Patent [19]

Behel, Jr.

[11] Patent Number: 5,366,533
[45] Date of Patent: Nov. 22, 1994

[54] MICRONUTRIENT DELIVERY SYSTEM USING CITRUS BY-PRODUCT

[75] Inventor: Allan D. Behel, Jr., Florence, Ala.
[73] Assignee: Tennessee Valley Authority, Muscle Shoals, Ala.
[21] Appl. No.: 165,786
[22] Filed: Dec. 13, 1993
[51] Int. Cl.$^5$ .............................................. C05F 5/00
[52] U.S. Cl. .................................. 71/23; 71/64.11; 71/903; 71/DIG. 2; 47/9
[58] Field of Search ................ 71/1, 11, 23, 64.07, 71/64.11, 64.13, 903, 904, DIG. 2; 47/9

[56] References Cited

FOREIGN PATENT DOCUMENTS 5145057 4/1976 Japan ..................................... 71/23
0065079 5/1977 Japan ..................................... 71/23

Primary Examiner—Ferris Lander
Attorney, Agent, or Firm—Robert A. Petrusek

[57] ABSTRACT

Inclusion of a certain finely powdered by-product of the citrus fruit processing industry, notably a waste product consisting of processed peel, stems, seeds, and pulp, with relatively inexpensive, finely-powdered soluble iron sulfate [$FeSO_4$ or $Fe_2(SO_4)_3$] significantly improves the efficiency of iron source fertilizer materials for iron-sensitive plants growing on iron-deficient soils and can maintain supply of available iron to growing plants for substantially extended periods of time. These compositions may be band applied in powdered or granular form in or near the seed row at or prior to planting or spot placed in the root zone of growing plants in soil. The dry band absorbs soil moisture to provide a unique environment which restricts contact of soluble iron fertilizers with the soil and provides for complexation of contained iron with naturally occurring organic acids in the by-product, thereby minimizing the extent of chemical reactions with the soil that reduce the availability of the applied iron to plant roots. Root penetration and proliferation into and around the band also is greater than in the soil matrix, resulting in greater uptake efficiency of applied iron. The ease of preparation and low cost of the product, coupled with significantly enhanced crop response, offer considerable advantage over existing iron source fertilizer materials.

9 Claims, No Drawings

MICRONUTRIENT DELIVERY SYSTEM USING CITRUS BY-PRODUCT

The invention herein described may be manufactured and used by or for the Government for governmental purposes without the payment to me of any royalty therefor.

INTRODUCTION

Chlorosis of plants, which is attributed to iron deficiency, has been widely reported in the open literature for well over a century, yet presently there is no effective, economical method including direct soil application to correct such iron deficiencies in plants. Chlorosis is characterized by a yellowing of plant leaves due to substantially diminished amounts of chlorophyll, the formation of which chlorophyll requires adequate quantities of the micronutrient iron. Theoretically, such conditions could be quickly corrected by application of, either directly to the plant or indirectly to the soil at the plant situs, iron sources which are in a form readily available to such plant. Until the present time, however, numerous problems have been found to exist with many iron-containing compounds which tend to prevent their general use for successfully treating such iron deficiencies in plants. Examples of such problems encountered comprise the cost of the materials, the difficulty of delivery to a crop, the need and expense for multiple applications, and the lack of plant response under various soil conditions wherein iron chlorosis occurs.

The materials most commonly utilized to date for effecting treatment, albeit, not totally successful, of iron deficiencies have been ferrous and ferric sulfates and certain organic iron-containing compounds known as synthetic chelates or natural organic complexes. (John Mortvedt, Iron Sources and Management Practices for Correcting Iron Chlorosis Problems, *Journal of Plant Nutrition* 9:961–974, 1986). While the inorganic ferrous and ferric sulfates are relatively inexpensive, plant response to them has been found to be generally inadequate if they are applied directly to calcareous soils, wherein most such iron deficiencies occur. For instance, it has been long known that subsequent to soil application, iron sulfates quickly react to form compounds such as, for example, ferric hydroxides, the iron values of which are unavailable to plants. While some other sources of iron, generally characterized as chelates, do not react with soil to form unavailable compounds, they are so expensive that their use is restricted to application on high-value crops or for other specialized situations.

Until the present time, the most economical method used to correct iron chlorosis has been multiple and timely foliar applications of ferrous sulfate ($FeSO_4$) to the growing plants. This has been practical only on moderately iron-deficient soils. Economically justifiable results with such periodic foliar application have been poor or are frequently not obtained on soils which are characterized as being very low in available iron. In addition, the timing of foliar spray applications has been found to be quite critical in order to obtain satisfactory correction of the chlorosis condition. It has also been observed by researchers and reported in the literature that the leaves of sprayed plants may be damaged by some foliar sprays containing certain compounds or by sprays containing relatively high salt concentrations of other compounds. In addition, it has been reported that such foliar application, unless continued periodically over a substantial period of time may not be particularly effective since new growth appearing after initial spraying may again be chlorotic. Accordingly, it may reasonably be concluded that foliar spray applications are not always a satisfactory and/or economical method for correcting iron deficiencies in plants. Until the present time, the second most economical method used to correct iron chlorosis has been a single soil application of a band of hydrophilic polymer which contains inorganic iron sulfate (Mortvedt, et al., U.S. Pat. No. 5,221,313, Jun. 22, 1993). However, these products are also relatively expensive, difficult to apply to the soil, and require specialized application equipment, such as positive displacement pumps, which are not part of the normal inventory of farming equipment.

It has now been found that many of the above shortcomings for treating chlorosis can be overcome by practice of the present invention, wherein has been devised a new delivery system for soil situs placement of relatively inexpensive iron sulfates; said delivery system characterized by its ability to effectively isolate, and provide chemical protection by complexing with, for substantial periods of time, the iron sulfates contained and delivered therein from the deleterious effects of various soil constituents which normally give rise to rendering such iron sulfates unavailable to growing plants. Accordingly, the instant invention is presented in a principal embodiment directed to overcoming the chlorosis problem and an alternative embodiment directed to delivery and focus for more effective uptake of iron known to be required by growing plants.

BACKGROUND OF THE INVENTION
1. Field of the Invention

The present invention relates to the development of inexpensive materials and means to apply them which are eminently suitable for the correction of iron deficiency-induced chlorosis in plants. More particularly, the present invention relates to the development of certain combinations of a by-product of the citrus fruit processing industry and of iron-containing fertilizer or fertilizer amendment materials (FAM) having characteristics which significantly increase their efficiency to correct iron deficiency-induced chlorosis in plants. The term citrus by-product, as used herein, means the waste or remains resulting after the processing of various whole citrus fruits for juice, feed-stuffs, flavorings, etc., a substantial portion of which is represented by pulp, peel, and seeds, and oftentimes found in combination with minor amounts of stems and leaves. Still more particularly, the instant invention relates to the discovery that certain organic acids, particularly citric acid, contained in the citrus by-product, when wetted by water in the soil, will react to complex and otherwise protect selected iron compounds to provide an economical and readily available iron source imminently suitable for correcting iron deficiencies in plant life growing at such situs. Even still more particularly, the instant invention relates to the discovery that both such by-product citrus material and FAMs should be very finely ground separately and thereafter mixed together in proper portions, thus to maximize the surface area and reactivity of the contained iron and the certain organic acids, particularly citric acid, to provide maximum availability of contained iron to plants. Finally, the instant invention relates to the discovery that the such combinations of citrus by-product and iron-containing fertilizer or iron source FAMs should be band applied in a continuous intact band at or prior to planting or spot placed in the root zone of growing plants in soil to minimize the contact of these products with the soil so that chemical reactions which adversely affect the availability of these products to plants are minimized.

2. Description of the Prior Art

Iron is an essential element in plant nutrition and generally is classified as a micronutrient. It is known to be involved in the synthesis of chlorophyll which in turn is required for photosynthesis in plants. A deficiency of this micronutrient in growing plants, which can be greatly exaggerated in calcareous type soils, is oftentimes the cause of chlorosis, which is characterized by a yellowing of plant leaves and stems and which results in particularly poor growth.

Currently available practices for alleviating such iron deficiencies in growing plants include the application of synthetic iron chelates to soil or the use of various soluble iron compounds as foliar sprays for direct application to the plants or the use of certain hydrophilic polymer delivery systems. Currently, the least expensive, in terms of up-front per unit cost, water-soluble iron compound in use is iron sulfate, either in its reduced state, e.g., ($FeSO_4$) or in the ferric state, e.g. [$Fe_2(SO_4)_3$]. However, $FeSO_4$ or $Fe_2(SO_4)_3$ should not be applied directly to soil lest either source quickly becomes combined with certain components in the soil to form water-insoluble compounds thereby rendering such iron unavailable to growing plants.

The synthetic chelate FeEDDHA [ferric chelate of ethylenediamine (di-(o-hydroxyphenyl acetate))] has been deemed to be the most effective iron fertilizer for soil application, especially in calcareous soils (Arthur Wallace, *A Decade of Synthetic Chelating Agents in Inorganic Plant Nutrition*, Edwards Brothers, Inc., Ann Arbor, Mich., 1962). However, the per unit cost of iron in FeEDDRA is quite high, which makes this iron chelate material much too expensive for application to relatively low-value field crops. Another currently available and somewhat less expensive iron chelate material, FeEDTA (monosodium ferric ethylenediamine tetraacetate), has proven to be effective for crops growing in near neutral soils but not in calcareous, high-pH soils wherein most iron deficiencies occur. Another recent discovery also somewhat less costly than chelates are hydrophilic polymer delivery systems (Mortvedt, et al., U.S. Pat. No. 5,221,313, Jun. 22, 1993). However, the application of these is difficult and requires specialized equipment; the polymer in the formulations is also relatively expensive. Nevertheless, the initial per unit cost of iron in iron sulfate is significantly lower than in the chelates or the hydrophilic polymer systems. Accordingly, iron sulfate would be the more economical FAM eminently suitable for field crops if it remained available to growing plants subsequent to its contact or juxtapositioning with the soil situs. Therefore, additives or conditioners which can significantly improve the effectiveness of iron sulfate for the treatment of chlorosis could, in turn result in an economically effective iron source FAM for soil application.

Currently, it is the practice in the trade for iron-containing or iron source FAMs to either be applied to soil separately or to be incorporated with other materials in the processing or blending of fertilizers or to be applied in a hydrophilic gel polymer matrix. The effectiveness of iron source FAMs in maintaining a supply of iron to growing plants depends upon the chemical nature of the iron source materials and/or the soil, as well as their rate and/or frequency of application. Economic considerations regarding the use of iron source FAMs are determined by their costs and rate of application and ease of application relative to the returns attributable to increased yields of the crops to which they are applied. Presently, the most effective iron chelate, FeEDDHA, is so costly that its use is restricted to high-cash value crops such as, for example, apples, grapes, and peaches, or high-cash value ornamental crops such as, for example, rhododendrons, azaleas, and dwarf citrus, while other methods, i.e., hydrophilic polymer delivery systems, are nonetheless still expensive in addition to being difficult to apply and are not as effective as FeEDDHA, while the least costly, on a front-end per unit cost basis, iron source FAMs are ineffective when used in procedures designed to correct iron chlorosis in many lower value crops, such as, for example, corn, grain sorghum and soybean.

From the aforesaid, it should now be abundantly clear that the prior art materials designed as, or intended to be, iron source FAMs are either too costly up front to be economical for use on most field crops or are difficult to apply and require specialized application equipment or although available at relatively low unit cost, are still highly uneconomical to use since they are ineffective in maintaining a supply of available iron to crops growing on iron-deficient soils.

Investigations leading to the making of the invention of Mortvedt, et al. (U.S. Pat. No. 5,221,313, Jun. 22, 1993) have now led to the instant unexpected discovery that the use of citric acid or other similar organic acids such as malic or lactic acid, in the hydrophilic polymer delivery system will cause chemical protection to occur for contained iron in addition to the physical protection provided by the hydrophilic gel matrix, and will cause enhanced iron uptake by plants over the FAM in combination with the hydrophilic polymer. The rationale for this is that citric acid is a complexing agent for iron which forms sufficiently strong compounds with iron as to prevent dissolution of the iron from the compound once in soil. Otherwise, the iron subsequently would combine with certain components in the soil to form water-insoluble compounds which are unavailable to growing plants. The fact that citric acid does in fact form such sufficiently strong compounds is attested to by the numerical value of the formation or stability constants which are $\log K° = 4.4$ for $FeSO_4$ and $\log K° = 11.1$ for $Fe_2(SO_4)_3$ However, it was early on recognized that pure grade citric acid or other organic acids adds significantly to the cost of the original hydrophilic polymer delivery systems. A search for a less expensive source of citric acid led to the unexpected discovery that a by-product of the citrus industry known and referred to in the trade supply as citrus pulp, which contains only from 0.5% to about 1.0% citric acid, if finely ground, can be used as a substitute for pure grade citric acid in hydrophilic polymer delivery systems. Moreover, and more significantly, it was unexpectedly discovered that a combination of such citrus by-product (CBP) when very finely ground and mixed into intimate contact with powdered iron sulfate (the whole being referred to as CBP Mix) and thereafter applied in a band to soil situs, was more effective in enhancing plant growth than either FeEDDHA or the hydrophilic delivery system of Mortvedt, et al., supra, or iron sulfate alone. Moreover, and even more significantly, it has now been discovered that since the principal components of said citrus by-product are primarily lignin, cellulose, and hemicellulose plant substances which decompose in soil at varying rates, that it can now herein be postulated that the CBP will provide not only immediately available iron to crops but also over a longer period of time, most likely up to one year. The rates of decomposition one year after addition to soil are detailed in O. L. Smith, *Soil Microbiology: A Model of Decomposition and Nutrient Cycling*, CRC Press, Boca Raton, Fla., 1982, and are: lignin—50%/yr; cellulose—75%/yr; and hemicellulose—90%/yr. Thus, it is now herein postulated that the instant invention can be effected to provide a novel method for improving the efficiency of iron uptake by plants in calcareous soils.

SUMMARY OF THE INVENTION

It has now been discovered that a certain citrus industry by-product; namely, a waste product costing about 6 cents per pound and consisting of citrus peel, stems, seeds, and/or pulp, heretofore primarily used as cattle feed, as a means of disposal and primarily exported to European countries, in combination with certain iron source FAMs, particularly those comprising iron sulfates, result in materials which, after soil application, demonstrate substantially enhanced availability of iron to plants at or near the application situs, and work as well as currently available synthetic iron chelating agents which sell at prices ranging upwards of $180 per pound, on an iron equivalent basis. On the same iron equivalent basis, the instant citrus by-product material, when made with iron sulfates, costs about $9 per pound, which represents about 5% of the cost of such currently used iron chelating agents.

These instant new combinations may conveniently be subsurface band applied to soil, either as a fine powder or as a compacted granule. Accordingly, the application of this material in relatively narrow continuous bands, on the order of about ¼ to ¾ inches in diameter, along or parallel to the seed row or spot placed in the root zone of living plants is normally the easiest and most convenient manner of distribution.

It would appear that the principal mechanisms which are responsible for preserving, for a substantial period of time, these iron source FAMs in a form which ultimately is readily available to growing plants is one of isolation by chemical means of complexing by naturally-occurring organic acids in the citrus by-product, particularly citric acid, of such iron source materials from the deleterious effects of or combinations with soil components, including aqueous media, at or near the application situs. In addition, it has now been discovered that the preferred methods of application; namely, subsurface band application to soil at or prior to planting or spot application in the root zone of growing plants in soil, result in isolating such materials from reacting with the soil to form compounds which are unavailable to plants.

The results of preliminary investigations indicate that these iron source FAM and citrus by-product combinations are effective for use on a variety of iron-sensitive crops growing on iron-deficient soils. It has also been discovered that they may be band applied near the seed row at planting. In addition, it is proposed that they may be used as specialty fertilizers to other crops, providing they are spot placed in the root zone or what will be the root zone in the soil rather than on the soil surface. These combinations may be especially beneficial for perennial crops such as certain slower growing fruit trees, grape vines, and shrubs because after the initial rapid decomposition phase, biodegradation of the mixture buried within soil occurs more slowly over a longer period of time. These combinations may also be especially beneficial to lower-cash value row crops such as grain sorghum, corn, and soybeans since the product is significantly less costly to produce and use than alternative methods of iron fertilization and also provides for initial and sustained iron availability for a crop during a growing season.

The results of further investigations into the utilization of iron in the CBP Mix revealed that band application established veins of the CBP Mix in the immediate vicinity anticipated for plant root development. After sufficient time had elapsed for such development, cross sectioning of such veins and observation of the soil matrix surrounding these areas clearly showed an unusual propensity of root and root hair growth in the product region in preference to the surrounding soil matrix thereby clearly establishing that such delivery system focuses plant root development in a fashion whereby contact with and uptake of micronutrients, such as, iron, in such veined regions is not only substantially enhanced but is, indeed, totally optimized.

Another aspect of the instant new invention relates to a method for enhancing the yield and/or growth of plants by distributing the compositions comprising this invention in the "plant growth media" in which the plants are being grown within reach of the root system of the plants (hereinafter referred to as "root zone"). As used herein, the term "plant growth media" refers to various natural and artificial media which support plant growth, including but not limited to soil, potting mixtures of organic and inorganic matter and artificial media such as polyurethane foam.

Yet another aspect of the instant, new and novel invention relates to a method for inhibiting the degradation of certain water-soluble iron source micronutrient materials, principally iron sulfates, including ferric sulfate or ferrous sulfate or both, when said iron source micronutrients are applied to such plant growth media, which aspect comprises providing an effective isolation of said water-soluble iron source micronutrients from said plant growth media such that same do not react with components therein in a fashion whereby the iron sulfates form water-insoluble or substantially water-insoluble compounds, which water-insoluble compounds are or become unavailable for purposes of plant growth sought to be treated with such iron source micronutrients. A principal embodiment of the present invention, which provides such effective isolation is the mixing and resultant intimate contact between CBP and iron source FAMs from which arises complexation and containment of iron sulfates by organic acids, particularly citric acid, derived from the by-product. Practice of the instant invention ensures that iron sulfates so processed remain substantially water-soluble in the resulting formed mixture. As used herein, the term "effective isolation" refers to and means the protective mechanism of complexation of the iron sulfates, supra, in an intimate mixture formed with citrus by-product and iron sulfate that encompasses an isolation or separation so effective that all or most of the so-treated iron sulfates remain substantially water-soluble for at least a period of about 2 weeks and preferably a period ranging from at least about 4 to about 6 weeks, more preferably at least about 90 days, and most preferably for a period of time ranging upwards to 1 year, or more. As used herein, the term "citrus by-product mixture" or "CBP Mix" refers to and means the product resulting from grinding and mixing into intimate contact of effective amounts of CBP with predetermined amounts of selected iron FAM. As used herein, the term "substantially water-soluble" encompasses materials which are initially water-soluble such as ferric sulfate or materials which have only degraded, by reaction with components in growth media to the point that the resulting reaction products in combination with the unreacted materials, in the aggregate, provide a material which is at least about 60% water-soluble. As used herein, the term "root zone" refers to and means that area in the plant growth media within the reach of the root system of a particular desired plant or crop and in the field normally comprises that portion of the soil matrix generally beneath the seed planting band and areas juxtaposed thereto, generally parallel with the band and protruding downwardly from a few inches to perhaps about a foot. In the practice of the invention there will oftentimes be provided veins or islands of iron-enriched CBP Mix through such root zone in a fashion such that any plant roots entering therein will be provided with an environment enhanced both mechanically and nutritionally by virtue of the uniformity of consistency of said mixture which is considerably more easily penetrated and expanded into than is a normal soil matrix and which by virtue of the finely divided nature of the mixture and the ease of wetting of the mixture for the roots growing therein, as well as the abundant supply of desirable iron, provides a micro-environment wherein root growth is substantially enhanced. As used herein, the term "enhanced root growth region" refers to and means such plant growth media discontinuities comprising iron-enriched citrus by-product mixtures of the type herein contemplated and referenced.

Still yet another aspect of the instant, new and improved invention relates to the ease of the application thereof to a desired situs including soil. Product formulations are such that soil application rates of the product will be relatively high, while the expense of such product to supply a given amount of iron is very low. Thus, precise metering and application rates of the fine powder form is unnecessary, so long as a sufficient amount of iron is supplied to meet plant needs.

OBJECTS OF THE INVENTION

It is therefore a principal object of the present invention to provide a new and improved combination of materials which are eminently suitable for supplying iron to soil systems and/or to the situs of growing plants for substantial periods of time of at least about 14 days, preferably of at least about 28 days, and most preferably of at least about 45 days, and in a form such that they can readily be absorbed by the roots of such growing plants, i.e., completely, or at least about 60% water-soluble.

Another principal object of the present invention is to provide a new and improved system and process, as well as a new combination of materials eminently suitable for supplying iron to soil systems and/or to the situs of growing plants for substantial periods of time and in a form such that although such materials may be band applied near the seed row in soil or spot placed directly in the root zone of growing plants, they will be in a form readily available for absorption by the roots of such growing plants.

A still further principal object of the present invention is to provide a new and improved system and process, as well as a new combination of materials eminently suitable for soil applications and for supplying iron to soil systems and/or to the situs of growing plants in a form such that they will be absorbed by the roots of such growing plants and wherein such materials comprise either separate components or admixtures of components including a certain organic citrus by-product and iron source FAMs, said iron source FAMs including ferrous and ferric sulfate.

Another principal object of the present invention is to provide a new and improved technique, as well as a new combination of materials eminently suitable for supplying iron to soil systems and/or to the situs of growing situses to act as a most efficient delivery system for such iron, and for uptake by growing plants in a manner wherein upon contact and penetration of said citrus by-product mixture the plant roots evidence an unusual propensity for further growth thereinto, whereby the uptake of iron values are more effectively utilized than they could be if homogeneously mixed in the surrounding soil matrix.

Still further and more general objects and advantages of the present invention will appear from the more detailed description set forth in the following disclosure and examples, it being understood, however, that this more detailed description is given by way of illustration and explanation only and not necessarily by way of limitation, since various changes therein may be made by those skilled in the art without departing from the true spirit and scope of the gist underlying the present invention.

DESCRIPTION OF THE PREFERRED EMBODIMENTS

The present invention is directed to a system for, and processes and/or methods to mix, as well as the specific compositions utilized therein for applying to a designated soil situs, a combinations of citrus by-product and selected water-soluble compounds of iron including, in the most preferred embodiments, ferrous sulfate, or ferric sulfate. Practice of the instant invention results in improved fertilizers having incorporated therein water-soluble compounds of iron in forms wherein same are sufficiently isolated, at least temporarily, from contact with soil media but are juxtaposed such media such that the iron values therein remain available to maintain the prerequisite supply of iron in a form readily useful to plants growing at or near such situs. For convenience to the reader, the selected procedure is described below.

Iron sulfate (ferrous or ferric) is finely powdered to about −270 +325 mesh (U.S. Standard Screen), but most preferably 300 mesh (about 0.05 mm) particle size by any of various means such as, for example, an Ultra Centrifugal Mill (Retsch Type ZM-1) or similar device. NOTE: Any references made herein to materials and/or apparatus which are identified by trademarks, trade names, etc., are included solely for the convenience of the reader and are not intended as, or to be construed, an endorsement of said materials and/or apparatus. The CBP is finely ground directly as received, or most preferably is oven dried for a predetermined period of time which may range on the low end of from about 4 to 6 hours and on the high end from about 10 to about 16 hours, but most preferably about 8 hours, and at temperatures elevated above ambient but below that at which decomposition or degradation of such citrus by-product material occurs. Conveniently, such a temperature may be between about 50° C. to about 60° C., and most preferably 55° C., to thereby attain a sufficiently low moisture content of the CBP to promote sufficient brittleness thereof for ease of grinding. The CBP is then finely powdered to about −270 +325 mesh (U.S. Standard Screen) particle size, but most preferably about 300 mesh (about 0.05mm) particle size by any of various mechanical means such as a Standard Wiley mill or similar device. The iron sulfate and citrus by-product then are intimately mixed into a homogeneous powder combination having a concentration of most preferably about 5% iron sulfate and about 95% CBP. This requires 50 grams of $FeSO_4$ or $Fe_2(SO_4)_3$ and 950 grams of CBP per one kilogram of mixed product. The final concentration of iron in such mixtures of CBP and iron sulfate is most preferably about 1% by weight. The mixture then may be applied to the soil as a fine powder. For more convenient application to soil, the aforesaid mixture may be compressed and tableted in such suitable device as a rotary tableting press (Coulton Model 216) or other such suitable commercial device. The resulting formulation subsequently may conveniently be band applied, at a rate ranging between about 4 to about 40 pounds of iron per acre, preferably about 1 to 3 inches below the soil surface and near to (1 to 2 inches horizontally) the seed row at or prior to planting, or spot placed in the root zone of growing plants.

EXAMPLES

In order that those skilled in the art may better understand how the present invention can be practiced, the following examples are given by way of illustration only and not necessarily by way of limitation, since numerous variations thereof will occur and will undoubtedly be made by those skilled in the art without substantially departing from the true and intended scope and spirit of the instant invention herein taught and disclosed.

Greenhouse pot experiments were conducted to determine availability of iron in various iron source FAM and citrus by-product mixtures, with each mixture being applied in a band ($\frac{1}{4}$ to $\frac{3}{4}$-inch in diameter and 4 to 6 inches long at a depth of 2 inches below the soil surface and 1 inch away from the seed row to a calcareous iron-deficient soil at an application rate ranging between about 10 and about 40 pounds of iron per acre. For comparison purposes, each iron fertilizer, namely iron (ferrous or ferric) sulfate and FeEDDHA was band applied by itself at the same soil depth and distance from the seed row. In addition, various hydrophilic polymer plus iron sulfate formulations were band applied in like fashion to compare the new instant invention with these products.

In the following three examples, unless otherwise indicated, all parts and percentage compositions are by weight. Each pot was 6 inches in diameter and was charged with about 1 kilogram of Epping silt loam soil. The soil in all greenhouse pots was fertilized uniformly with all known plant nutrients, except iron, at rates heretofore known or demonstrated to provide optimum plant response, so that any crop responses could be attributed to iron contained in the various materials, including the CBP-iron source FAM mixtures, or iron source FAMs or FeEDDHA or hydrophilic polymer-iron source FAMs applied as comparisons to the CBP Mix. See Konrad Mengel and E.A. Kirkby, *Principles of Plant Nutrition*, International Potash Institute, Bern, Switzerland (1982), herein incorporated by reference thereto, for an example of the variety and concentrations of micronutrients used to satisfy such requirements. The test crops for all experiments was grain sorghum (*Sorghum bachelor* L. Mince), cultivar RS-626, or corn (Zea Mays L), cultivar Pioneer 3398, both varieties known to be susceptible to iron chlorosis when grown on iron-deficient soils such as the Epping silt loam type herein used. Three replicates of each treatment were used in a completely randomized design. Deionized water was used during the entire growth period and forage was harvested after 6 weeks' growth. The soil in pots was sliced longitudinally post-harvest to examine fertilizer band characteristics.

The resulting CBP Mix, prepared as above and containing a proper diet of required iron, has been determined to more effectively deliver to the plants treated therewith the nutrient contained therein. It is believed that these products act to focus the beneficial efforts of such therein contained iron due to the fact that proper placement thereof at the soil situs juxtaposed the plant root both provide a protective matrix for iron contained therein and effectively causes or enhances root development and growth.

Accordingly, a first series of tests, reported in Example I, below, was designed to test the response of grain sorghum to iron contained in the CBP mixtures, iron contained in hydrophilic polymer delivery system formulations, iron contained in FeEDDHA, and iron contained in iron sulfates. The application rates for iron were 18 and 24 mg of iron per kilogram of pot soil for all FAMs tested. The hydrophilic delivery systems were described in the preferred embodiments of Mortvedt, et al, supra.

A second series of tests, reported in Example II, below, was designed to test the response of grain sorghum to iron contained in the CBP Mix, FeEDDHA, iron sulfates, and iron contained in hydrophilic polymer delivery systems which contained no citric acid, reagent grade citric acid, or citric acid supplied in the citrus by-product. The application rates for iron were 18 and 24 mg of iron per kilogram of pot soil for all FAMs tested.

A third series of tests, reported in Example III, below, was designed to test the response of corn to iron contained in the CBP Mix, FeEDDHA, iron sulfate, and iron contained in hydrophilic polymer delivery systems. The application rates for iron were 18 and 24 mg of iron per kilogram of pot soil for all FAMs tested.

In these three series of tests, projected results correlate with the hypothesis that such procedure will very effectively act to enhance plant growth and improve iron nutrition. In addition, results correlate with the hypothesis that such procedure will very effectively act to focus plant root growth in the specific regions and areas of iron placement. Finally, such procedure will thereby provide a new, improved, economical, and highly efficient delivery system for iron to preselected plants or plant pots.

EXAMPLE I

In the tests comprising this example, iron sulfate, in the reduced state, was band applied according to the procedures outlined above to a calcareous iron-deficient soil of the type Epping silt loam either alone or in combination with the citrus by-product mixture, or in combination with hydrophilic polymer gels of varying chemical structure, to wit, a polyacrylamide, or a polyacrylamide plus polyacrylate. The procedure used to prepare the gels comprising the polymer and iron sulfate combination was as described in the description of the preferred embodiments in Mortvedt, et al., supra. The iron and FAMs were subsurface band applied to soil forming ¼-inch diameter to ¾-inch diameter bands onto the soil in the test pots. The synthetic chelate, FeEDDHA, also was similarly band applied alone to soil. All iron FAMs were applied at two different rates, i.e., at 18 and at 24 mg of iron per kilogram of pot soil. It should be noted that in the test comprising this Example I, described in detail infra, typical 6-inch (150-millimeter) diameter greenhouse pots were used, with each 6-inch pot containing, on the average, 1 kilogram of iron-deficient soil. Also, typical to iron response tests, the potted crop was sorghum since it has long been used as a standard for such types of testing with 6 plants being maintained in each pot. See, for example, Aubra Mathers, Effect of ferrous sulfate and sulfuric acid on grain sorghum yields, *Agron. J.* 62:555–556 (1970). Typically, after six weeks of growth in the greenhouse environment the above-ground plant forage was harvested, dried, and weighed to determine response to testing materials relative to sorghum grown in pots as standards. Post-harvest examination of the bands was made by slicing the soil longitudinally along the fertilizer band. Visual observations for treatment effects, as judged by the degree of chlorosis in plants, indicated that there were no differences in effectiveness between the CBP Mix and FeEDDHA. However, sorghum forage yields and uptake of iron were highest with the citrus by-product mixture, see Table I, infra; the synthetic chelate FeEDDHA which was previously known to be the most effective iron fertilizer, ranked second below the CBP Mix (test No. 2) in yields and iron uptake. Crop response was lower still with $FeSO_4$ band applied alone. There were essentially no differences in yield or iron uptake between the CBP applied alone and the control (no added iron) pots. Post-harvest examination of soil showed well-moistened bands of CBP Mix into which roots had freely penetrated and proliferated. In addition, plant roots tended to be concentrated in and around the CBP Mix band, rather than evenly distributed throughout the plant growth media, i.e., an enhanced root growth region.

TABLE I

| Test No.[1] | Source/ Wt. % of Fe | Source/ Wt. % of Polymer | Fe band applied to soil (mg/pot) | | | | | | | | |
|---|---|---|---|---|---|---|---|---|---|---|---|
| | | | 0 | 18 | 24 | 0 | 18 | 24 | 0 | 18 | 24 |
| | | | Chlorosis[3] | | | Yield (g/pot) | | | Fe uptake (mg/pot) | | |
| 1 | FeEDDHA (100%) | — (0%) | — | A | A | — | 31.5 | 33.0 | — | 2.03 | 2.39 |
| 2 | CBP Mix[4] (1.0%) | — (0%) | — | A | A | — | 39.1 | 48.0 | — | 2.38 | 2.65 |
| 3 | $FeSO_4$ (0.12%) | A (4.5%) | — | B | B | — | 22.0 | 24.0 | — | 1.53 | 1.54 |
| 4 | $FeSO_4$ (0.12%) | B (4.5%) | — | B | B | — | 17.0 | 18.1 | — | 1.02 | 1.29 |
| 5 | $FeSO_4$ (100%) | — (0%) | — | D | D | — | 7.2 | 10.7 | — | 0.43 | 0.68 |
| 6 | CBP[4] (0%) | — (0%) | D | — | — | 4.5 | — | — | 0.30 | — | — |
| 7 | Control (0%) | — | D | — | — | 3.8 | — | — | 0.27 | — | — |

[1]Three replicates used in all tests.
[2]A-polyacrylamide; B-commercial polyacrylamide and polyacrylate mixture (50% w/w). Products are formulated according to Mortvedt, et al., U.S. Pat. No. 5,221,313, June 22, 1993.
[3]Chlorosis rating scale: A = none; B = slight; C = moderate; D = severe.
[4]CBP Mix consists of 5% $FeSO_4$ (to give an Fe concentration of 1.0%) and 95% citrus by-product band applied to the soil as a fine powder; CBP is finely powdered citrus by-product only band applied to the soil.

EXAMPLE II

In the tests comprising this example, the CBP Mix, the CBP alone (Table I, test numbers 2 and 6, supra), and the CBP Mix containing additional citric acid were compared against hydrophilic polymer delivery systems (described in Mortvedt, et al., supra) to which varying amounts of citric acid had been added, for effectiveness as iron sources for grain sorghum. The same fertilizing, planting, and cropping procedures used in Example I, above, were followed in these tests. Both $FeSO_4$ and FeEDDHA were each band applied alone to soil and all iron source FAMs were applied at a rate of 18 mg of iron per pot. As in Example I, supra, in this and subsequent examples, the reference to band application is understood to mean the procedure set forth in the introductory portion of this section. Crop response again was greatest with the CBP Mix, followed by CBP Mix plus additional citric acid, then FeEDDHA, then the polymer mixtures. Response was poorest with $FeSO_4$ and the CBP alone. The same qualities of root penetration and proliferation as shown in Example I, supra, were again evident with the CBP Mix. The uncomplicated system comprising the CBP Mix and the significant increase in yields and iron uptake of plants treated with the CBP Mix over FeEDDHA and polymer treatments clearly demonstrated the superior attributes of the instant invention in this example. Results of these tests are shown in Table II, below.

TABLE II

| Test No.[1] | Product[2] | $FeSO_4$ Wt. % | Citric Acid Wt. % | Citrus By-Product Wt. % | Fe Band applied to soil, 18 mg/pot | | |
|---|---|---|---|---|---|---|---|
| | | | | | Chlorosis rating[3] | Yield, g/pot | Fe uptake, mg/pot |
| | | Wt. % | | | | | |
| 1 | Control | — | — | — | D | 6.2 | 0.46 |
| 2 | FeEDDHA | — | — | — | A | 39.1 | 1.83 |

TABLE II-continued

| Test No.[1] | Product[2] | FeSO₄ Wt. % | Citric Acid Wt. % | Citrus By-Product Wt. % | Fe Band applied to soil, 18 mg/pot | | |
|---|---|---|---|---|---|---|---|
| | | | | | Chlorosis rating[3] | Yield, g/pot | Fe uptake, mg/pot |
| 3 | FeSO₄ | 100 | — | — | D | 7.4 | 0.45 |
| 4 | CBP alone | — | — | 100.0 | D | 7.0 | 0.40 |
| 5 | CBP Mix | 5 | — | 95.0 | A | 48.7 | 2.38 |
| 6 | CBP Mix | 5 | 9.5 | 85.5 | A | 43.5 | 2.34 |
| 7 | Polymer A | 5 | — | 85.0 | B | 34.2 | 1.29 |
| 8 | Polymer A | 5 | 2.0 | 83.0 | B | 30.3 | 1.34 |
| 9 | Polymer A | 5 | 4.5 | 80.5 | B | 40.0 | 2.24 |
| 10 | Polymer A | 5 | 9.5 | 75.5 | A | 41.1 | 2.27 |
| 11 | Polymer B | 5 | — | 85.0 | B | 23.1 | 1.25 |
| 12 | Polymer B | 5 | 2.0 | 83.0 | A | 34.6 | 1.37 |
| 13 | Polymer B | 5 | 4.5 | 80.5 | A | 34.7 | 1.30 |
| 14 | Polymer B | 5 | 9.5 | 75.5 | A | 33.8 | 1.26 |

[1]Three replicates used in all tests.
[2]Concentration of polymers is 10% by weight. Polymer A-commercial polyacrylamide; Polymer B-polyacrylamide plus polyacrylate (80:20 w/w). Products are formulated according to Mortvedt, et al., U.S. Pat. No. 5,221,313, June 22, 1993.
[3]Chlorosis rating scale: A = none; B = slight; C = moderate; D = severe.

EXAMPLE III

Again, the iron source FAMs which were used in the first experiment above, i.e., Example I, test numbers 1 through 6, supra, plus an additional treatment, consisting of CBP Mix which had been tableted in a rotary press, were again band applied to the same iron-deficient type soil. In this example, essentially the same testing procedure used in Example I, supra, was utilized except that corn was used as the test crop in order to illustrate the versatility of the CBP Mix as an iron source for plants. The CBP Mix was superior to FeEDDHA in all but one instance (Test No. 4 in Table III, below), the tableted CBP Mix applied at the 18 mg of iron rate. The tableted CBP Mix was made by simply compressing together at high pressure (about 25,000 psi) a homogeneous mixture of iron sulfate and CBP in a rotary tableting press. A binder was not used in order to avoid confounding effects of extraneous materials in the mix. It had been anticipated that the high pressure was needed to ensure good handling properties of the product. However, the pressure employed in this instance may have been too high. Post-harvest examination of the fertilizer band, performed by slicing longitudinally along the band, revealed that the pills, although moist, were essentially intact in their original shape, and root penetration into the band was restricted. This presumably resulted in less iron uptake and a slower growth of the plant. Conversely, as in Examples I and II, supra, the application of the CBP Mix as a fine powder enhanced root penetration and growth into the fertilizer band. Nonetheless, the CBP Mix treatments (both fine powder and tableted) were also superior to the hydrophilic polymer delivery system treatments. Again, as discussed in Example I and Example II, supra, root penetration and proliferation into the band of CBP Mix were significant.

Examples I to III illustrated many conditions under which the objectives of the present invention are met. It will, of course, be appreciated by those skilled in this art that the subject tableted CBP Mix are not the state of the art in processing, but rather a bench scale approach to achieve a more versatile product. However, the agglomeration and granulation techniques currently available should easily result in a more finished product, with good handling performance, which would be viable and effective for correction of iron chlorosis in field crops, such as grain sorghum, corn, and soybeans. Accordingly, further studies to identify a promising compaction or granulation technique are now in progress.

TABLE III

| Test No.[1] | Source/ Wt. % of Fe[2] | Banded Fe rate, mg/pot | Chlorosis rating[3] | Yield, g/pot | Fe Uptake, mg/pot |
|---|---|---|---|---|---|
| 1 | FeEDDHA (100%) | 18 | A— | 32.6 | 1.41 |
| 2 | FeEDDHA (100%) | 24 | A | 36.4 | 1.56 |
| 3 | CBP Mix A (1.0%) | 18 | A— | 33.0 | 1.47 |
| 4 | CBP Mix B (1.0%) | 18 | B | 30.4 | 1.50 |
| 5 | CBP Mix A (1.0%) | 24 | A | 38.9 | 2.44 |
| 6 | CBP Mix B (1.0%) | 24 | A | 38.1 | 2.24 |
| 7 | Polymer A (0.12%) | 18 | B | 29.4 | 1.50 |
| 8 | Polymer A (0.12%) | 24 | A | 32.7 | 1.60 |
| 9 | Polymer B (0.12%) | 18 | B— | 27.9 | 1.37 |
| 10 | Polymer B (0.12%) | 24 | B | 28.6 | 1.56 |
| 11 | FeSO₄ (100%) | 18 | D | 16.5 | 1.26 |
| 12 | FeSO₄ (100%) | 24 | D | 18.2 | 1.33 |
| 13 | CBP alone (0%) | 0 | D | 19.7 | 1.27 |
| 14 | Control (0%) | 0 | D | 13.6 | 1.16 |

[1]Three replicates used in all tests.
[2]CBP Alone - citrus by-product alone band applied to soil as a fine powder;
CBP Mix A - mixture of 5% FeSO₄ and 95% citrus by-product band applied to soil as a fine powder;
CBP Mix B - tableted mixture of 5% FeSO₄ and 95% citrus by-product band applied to soil;
Polymer A - polyacrylamide; Polymer B - commercial polyacrylamide and polyacrylate mixture (50% w/w). Products are formulated according to Mortvedt, et al., U.S. Pat. No. 5,221,313, June 22, 1993.
[3]Chlorosis rating scale: A-none; B-slight; C-moderate; D-severe.

INVENTION PARAMETERS

After sifting and winnowing through the data herein presented, as well as other results and operations of the instant new, novel, and improved technique, including methods and means for the effecting thereof, the operating variables, including the acceptable and preferred conditions for carrying out my invention are summarized below:

TABLE IV

| Variables | Operating Limits | Preferred Limits | Most Preferred Limits |
|---|---|---|---|
| Citrus By-product % by wt of total mix | 70.0–95.0% | 80.0–95% | 95.0% |
| FeSO$_4$, or Fe$_2$(SO$_4$)$_3$ % by wt of total mix | 5.0–30.0% (1.0–6.0% Fe) | 5–20% (1–4% Fe) | 5.0% (1.0% Fe) |
| Drying time, hrs. | 4–16 | 6–12 | 8 |
| Drying temp., °C. | 10–60 (above ambient) | 50–60 | 55 |
| Particle size (U.S. Standard) | 250–400 | 270–325 | 300 |

While I have shown and described particular embodiments of my invention, modifications and variations thereof will occur to those skilled in the art. I wish it to be understood, therefore, that the appended claims are intended to cover such modifications and variations which are within the true scope and spirit of my invention.

What I claim as new and desire to secure by Letters of Patent of the United States is:

1. A composition of matter consisting essentially of a CBP Mix, said CBP Mix containing from about 70% to about 95% by weight citrus by-product, and from about 5.0% to about 30% by weight of an iron constituent comprising ferric sulfate or ferrous sulfate or both such that juxtapositioning such CBP Mix with plant growth media provides effective isolation of said iron constituent therefrom to thereby ensure that said iron constituent remains substantially water soluble for a period of time of at least about 14 days.

2. The composition of claim 1, wherein the citrus by-product content of said CBP Mix ranges from about 80% to about 95% by weight, and the ferric sulfate or ferrous sulfate or both ranges from about 5% to about 20% by weight, and further wherein said period of time, during which said iron constituent remains substantially water soluble, ranges from about 14 days to about 1 year.

3. The composition of claim 1, wherein the citrus by-product content of said CBP Mix is about 95% by weight, and the ferric sulfate or ferrous sulfate or both is about 5% by weight, and further wherein said period of time, during which said micronutrient constituent remains substantially water soluble, ranges from about 14 days to about 90 days.

4. A process for inhibiting the degradation of a water-soluble iron source micronutrient when applied to a situs comprising plant growth media by providing effective isolation of said water-soluble iron source micronutrient from said plant growth media, said water-soluble iron source micronutrient selected from the group consisting of ferric sulfate, ferrous sulfate and mixtures thereof, which process comprises the steps of:

(a) introducing into a mixing means, for intimately mixing solids, an amount of citrus by-product and an amount of iron sulfate sufficient to effect a resulting CBP Mix containing from between about 70% to about 95% citrus by-product by weight, and from between about 5% to about 30% iron sulfate by weight; and (b) subsequently applying at least a portion of said CBP Mix to a situs comprising plant growth media whereby is provided effective isolation of said water-soluble iron source micronutrient from the deleterious effects of reaction with said plant growth media.

5. The process of claim 4, wherein the particulate size of said citrus by-product is at least about 80% through 270 mesh.

6. The process of claim 5, wherein the particulate size of a said iron sulfate is at least about 80% through 270 mesh.

7. The process of claim 4, wherein the citrus by-product content of said CBP Mix ranges from about 80% to about 95% by weight, and the ferric sulfate or ferrous sulfate or both content of said CBP Mix ranges from about 5% to about 20% by weight, and further wherein said period of time, during which said effective isolation is provided such that the iron constituent in said sulfate remains substantially water soluble, is at least about 14 days.

8. The process of claim 7, wherein said CBP Mix comprises, by weight, about 95% citrus by-product, and about 5% ferric sulfate or ferrous sulfate or both, and further wherein said period of time, during which said iron constituent remains substantially water soluble, ranges from about 14 days to about 1 year.

9. The process of claim 7, wherein said period of time ranges from about 14 days to about 90 days.

* * * * *